Sept. 21, 1954  H. J. BAENEN  2,689,426
FISHING TIP-UP
Filed May 2, 1949

INVENTOR.
HOWARD J. BAENEN
BY
Stanley E Sinish
ATTORNEY

Patented Sept. 21, 1954

2,689,426

UNITED STATES PATENT OFFICE 2,689,426

FISHING TIP-UP

Howard J. Baenen, Green Bay, Wis.

Application May 2, 1949, Serial No. 90,989

6 Claims. (Cl. 43—15)

This invention relates to a fishing tip-up and more particularly to a spring-loaded fish line holder that is releasable by a pull exerted on the line, as by a biting fish, and will automatically jerk the line to cause the hook to be embedded in said biting fish.

It is an object of this invention to provide a spring-loaded fish line holder that is releasable by a pull exerted on the line, as by a biting fish, and will automatically jerk the line to cause the hook to be embedded in said biting fish.

It is another object to provide a tip-up that is reset by a single motion of the hand.

It is still another object of this invention to provide a tip-up that is responsive to pulls of selected magnitudes.

It is a further object to provide a tip-up, the parts of which interfit astride each other to form a compact assembly.

It is still a further object of this invention to provide a trigger actuated tip-up, the trigger sensitivity of which remains substantially constant throughout the trigger movement.

It is a final object to provide a tip-up that has a supporting arm adjustable in elevation and azimuth.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
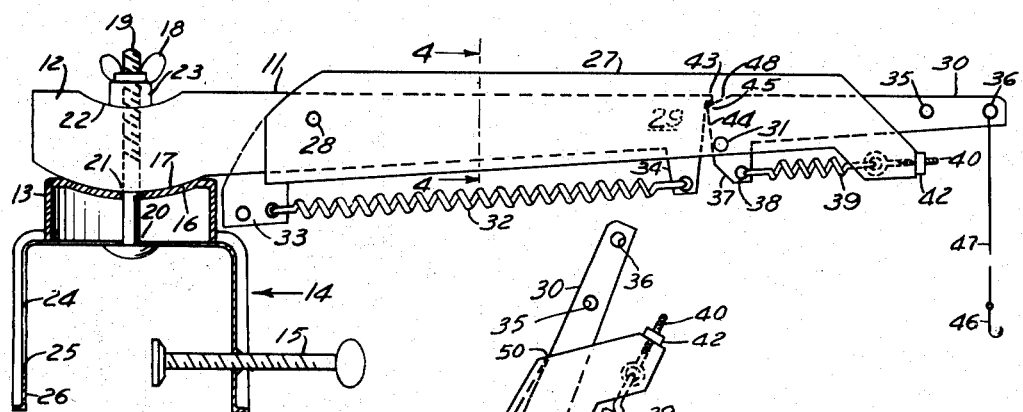
Fig. 1 is a side elevation view of a preferred embodiment of the invention in its cocked position with parts in section.

Referring now to the drawings wherein like reference characters designate like or corresponding parts throughout the several views, there is shown in Fig. 1 (which illustrates a preferred embodiment) supporting arm 11 made of sheet steel formed into a U-shaped cross-section, said arm being normally positioned so that the open side of the U is directed downwardly, and the closed side upwardly. One end 12 of said arm is adapted to be mounted on a support 13 mounted on a U-shaped clamp 14.

The U-shaped clamp is provided with the usual thumb screw 15 for tightening to any member such as a boat gunwale.

The support member 13 is a cup-shaped element mounted inverted on the top or closed side of the U-shaped clamp 14. The top 16 of the cup-shaped member is recessed concavely spherically to receive in sliding engagement thereon the spaced and correspondingly arcuated portions 17 on the end 12 of arm 11. This arrangement, construction and association of the companion arcuate portions 17 and the concave spherical cup top 16 allows arm 11 to be moved in azimuth and in elevation as desired. Any desired adjusted position of the arm 11 can be held secure by the tightening of wing nut 18 on the bolt 19. The closed end of U-shaped clamp 14 and the concave spherical top 16 are centrally apertured at 20 and 21, respectively, and the closed side of the U-shaped arm is also apertured at 22 in registry with said central apertures, to receive the securing bolt 19. Aperture 22 is an oblong aperture, longitudinally of arm 11, and is cut deeply and arcuately into the spaced leg sides of the U-shaped arm 11 to receive a corresponding arcuately cut washer 23. The arcuated portion of the washer 23, the arcuated portion 22, and the arcuated portions 17 are concentric to provide true elevational movement of arm 11.

The top and one leg of U-shaped clamp 14 is slotted at 24, from aperture 20 to terminus 25 to allow the arm 11, the support member 13, and the bolt 19 to be slid into a similar operative position on leg 26 of U-clamp 14 to accommodate clamping to the side of a boat gunwale as differentiated from clamping over the top of the gunwale.

Figure 4:
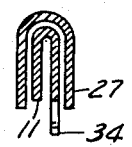
Fig. 4 is a cross-section view taken along line 4—4 of Fig. 1.
Figure 3:
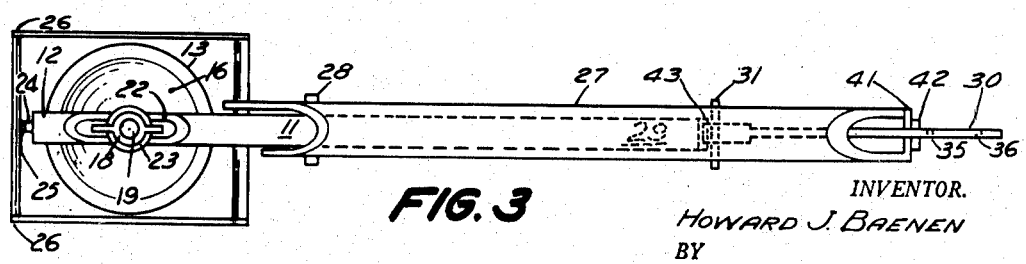
Fig. 3 is a plan view of the invention.

Pivotable arm 27, made of sheet steel formed into a U-shaped cross-section, is pivoted to supporting arm 11 as at 28. The U cross-section of pivotable arm 27 is larger than the U cross-section of supporting arm 11 thereby allowing the pivotable arm to overlie astride the supporting arm 11 as shown in Fig. 4; and the pivotal U-shaped arm 27 has its outer end extending beyond the free end 29 of said supporting arm 11 to allow for the reception therein of pivotal trigger or latch 30 pivoted thereto at 31. Pivot 31 is spaced downwardly of pivot 28 to provide an arrangement for automatic cocking as hereinafter described.

Pivotal arm 27 is provided with a projection 33 integral with one of its sides, and the free end 29 of supporting arm 11 is likewise provided with a companion extending lug 34. A tension spring 32 is connected to said projection 33 and is anchored to lug 34, thus spring loading arm 27 for pivotal movement upwardly relative to the supporting arm 11.

Trigger 30, pivoted at 31, is an elongated arm extending beyond the end of pivotal arm 27, and has apertures 35 and 36 at its end to receive and secure therein the end of a fish line. The pivot end of said trigger is provided with an integral projection 37 which is apertured at 38 to receive a hook end of tension spring 39, the other end of said spring 39 being engaged with the eye of eye-bolt 40 anchored to the apertured end wall 41 of pivotal arm 27 through means of a nut 42 in engagement with said eye-bolt 40. This nut and eye-bolt arrangement provides adjusting means for tensioning spring 39 and thereby spring loading the trigger to any degree of bias or sensitiveness desired.

The very end of supporting arm 11 is provided with a small projection, detent or catch 43 operatively disposed to slidingly engage the cam edge 44 of trigger 30 above the pivot 31 and to urge and pivot said trigger against the tension stress of the spring 39 until the trigger corner 45 is thrust under the projection 43 in latch engagement therewith.

It is to be noted that the slanting shoulder 48 is provided by forming, filing off, cutting off, or otherwise removing an otherwise sharp corner at this location. It is this shoulder in the zone of corner 45 that lodges under projection 43 for latch engagement therewith. The shoulder 48 is at an angle with the horizontal and is operative to allow pivotal movement of the shoulder portion 48 about pivot 31 without an apparent lifting of projection 43, and without the introduction of additional resistive forces, as would occur if the corner remained sharp and uncut thereby providing a detrimental increased pivotal axis to the corner. It is obvious then, that to achieve the best results, the shoulder must be slanted or declined so that the points on the operating range become progressively nearer to the pivotal axis, the points being considered from the initial to the final operating points. The inclined shoulder 48 is operative to allow pivotal movement of the shoulder portion 48 about pivot 31 without an ensuing downward thrust of the assembled pivotal arm 27 and the trigger 30 carried thereby, which downward thrust, if not eliminated, would result in an increased tensile stress in spring 32 and a consequential loss in sensitivity of the trigger action, caused by said objectional additional resistive forces.

Figure 5:
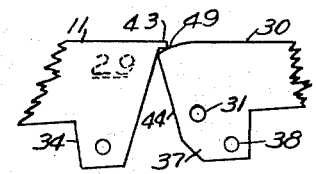
Fig. 5 is a sectional view of a modified form showing the trigger provided with an arcuate shoulder in latched engagement with the catch.

It is obvious that if an arcuate shoulder 49 is provided with its center at pivot 31, as shown in Fig. 5, then as the arcuate shoulder portion 49 is pivoted about pivot 31, there would be no added reaction between the shoulder 49 and projection 43 since all points on arcuate shoulder 49 are equidistant from the pivot point 31. Consequently, the sensitivity of the trigger would remain constant throughout its pivotal displacement.

The angular displacement of trigger latch 30 is limited in its downward swing by end wall 41, and in its upward swing by arm edge 50.

The angular displacement of pivotal arm 27 is limited by catch 43, and arm edge 51.

In operation, the device is secured to a boat gunwale through means of clamp 14. For still fishing the support arm 11 and assembly carried thereby are positioned horizontally in the cup-shaped element 13.

For trolling, the arm is secured by the wing nut 18 in an elevated position for the best response for that type of fishing.

Figure 2:
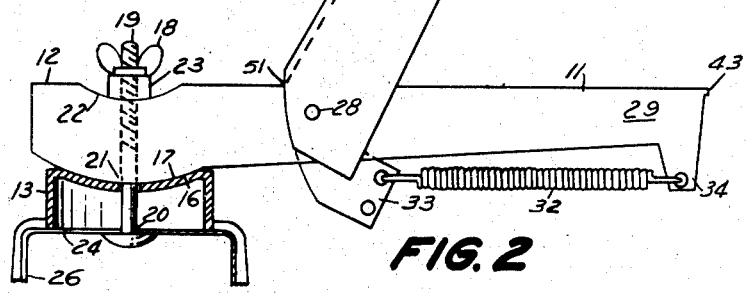
Fig. 2 is a plan view of the invention, in its fully released position with parts in section.

The latched or cocked position of the device is shown in Fig. 1. It will be noted that pivotal arm 27 is biased to pivot upwardly, but is constrained by the latched engagement of trigger 30, carried by said pivot arm, with the catch 43 on supporting arm 11. As a fish nibbles on the hook 46 and tends to pull or swim with it that motion is communicated to the trigger 30 through means of line 47 resulting in the trigger end being pivoted downwardly about its pivot 31. After a predetermined amount of said pivotal movement the trigger becomes unlatched from catch 43 thereby releasing spring loaded arm 27 which is violently pivoted and thrust upwardly, jerking the line and hook along with it as shown in Fig. 2. This action embeds the hook in the biting fish's mouth and secures the same for the fisherman to be pulled in at will.

To again cock the device one needs only to push down on pivotal arm 27 until the trigger and the projection re-engage.

It is an object of this invention to provide a fishing tip-up that is self-cocking; is actuated to a cocking position by the use of only one hand in a single motion; and embodies a spring loaded trigger the tension of which can be adjusted to compensate for the weight of the sinker, for rough water action, and for drag resistance while trolling.

It should be understood, of course, that the foregoing disclosure relates to only two preferred embodiments of the invention and that numerous modifications or alterations may be made therein without departing from the spirit and the scope of the invention as set forth in the appended claims.

What is claimed and desired to be protected by Letters Patent of the United States is:

1. A fishing tip-up, comprising: an elongated guide arm having its inner end portion adapted to be mounted on supporting means, and its outer end provided with a longitudinally projecting detent, and a lug depending from said outer end; an elongated pivotal member having a U-shaped cross-section disposed astraddle said guide arm, the inner end of said pivotal member being provided with a depending ear, and being disposed adjacent the inner end portion of said guide arm, and the outer end portion of said pivotal member extending beyond the outer end of said guide arm and having an end wall positioned across the lower portion of said extension; a pivot extending laterally through the side walls of said U-shaped member and through said straddled guide arm for pivoting said member relative to said guide arm, said pivot being disposed at the inner end portion of said member, said guide arm being operative to guide said member into straddling registry with the guide arm when the member is pivotally actuated toward said guide arm; an elongated latch arm, longitudinally aligned with said pivotal member, pivoted within the outer end portion of said U-shaped member, the pivotal axis of said latch arm being parallel to the pivotal axis of said member, the inner end portion of said latch arm having a depending ear, the inner end edge of said latch arm being a cam edge slidably engageable with said detent and terminating with a shoulder for engagement with the underside of said detent, and the outer end of said latch arm being disposed through the outer end of said member and being adapted to have secured thereto a fishing line; a coil spring connected across the depending lug on said guide arm and the depending ear on said pivotal member, operative to urge the said member pivotally away from said guide arm; adjustable coil spring means connected across the end wall on said pivotal member and the depending ear on said latch arm, operative to urge the cam edge of said latch arm against said detent, and said shoulder into interlocked engagement with the underside of said detent; and stop means on said member for limiting the counter-clockwise travel of said latch arm, operative to dispose said cam edge in an engageable position relative to said detent prior to its cocked engagement with said detent.

2. The apparatus of claim 1, wherein the shoulder of the latch arm is arcuate, the center of said arcuate shoulder being at the pivotal axis of said latch arm.

3. The apparatus of claim 1, wherein the shoulder of the latch arm is outwardly and downwardly declined, so that the points on the operating range of said shoulder become progressively nearer to the pivotal axis of said latch arm, the points being considered from the initial to the final operating points.

4. A fishing tip-up, comprising: an elongated guide arm having its inner end portion adapted to be mounted on supporting means, and its outer end portion provided with a detent; an elongated pivotal member having a U-shaped cross-section disposed astraddle said guide arm and pivotally connected at its inner end to said guide arm, at the inner end portion thereof, said guide arm being operative to guide said member into straddling registry with the guide arm when the member is pivotally actuated toward said guide arm; a latch arm pivotally mounted on said member, the inner end of said latch arm being a cam edge slidably engageable with said detent and terminating with a shoulder for engagement with said detent; spring means interposed between said latch arm and said member operative to urge the inner end of said latch arm against said detent; stop means on said member for limiting the spring urged pivotal travel of said latch arm, operative to hold said latch arm in an engageable position relative to said detent; and spring means interposed between said member and said guide arm, operative to urge said member pivotally away from said guide arm.

5. The apparatus of claim 4, wherein the shoulder of the latch arm is arcuate, the center of said arcuate shoulder being at the pivotal axis of said latch arm.

6. The apparatus of claim 4, wherein the shoulder of the latch arm is outwardly and downwardly declined.

References Cited in the file of this patent

UNITED STATES PATENTS

| Number | Name | Date |
|---|---|---|
| 2,286,743 | Ladd | June 16, 1942 |
| 2,340,588 | Groves | Feb. 1, 1944 |
| 2,446,282 | Hart | Aug. 3, 1948 |
| 2,450,536 | Whitbread | Oct. 5, 1948 |

FOREIGN PATENTS

| Number | Country | Date |
|---|---|---|
| 8,443 | Norway | June 25, 1900 |
| 697,684 | France | Nov. 4, 1930 |